US011827267B2

(12) United States Patent
Akaishi et al.

(10) Patent No.: US 11,827,267 B2
(45) Date of Patent: Nov. 28, 2023

(54) STEERING DEVICE

(71) Applicant: YAMADA MANUFACTURING CO., LTD., Kiryu (JP)

(72) Inventors: Kazuya Akaishi, Kiryu (JP); Yasushi Yokokura, Kiryu (JP); Daichi Okumura, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 0 days.

(21) Appl. No.: 18/157,124

(22) Filed: Jan. 20, 2023

(65) Prior Publication Data
US 2023/0294752 A1 Sep. 21, 2023

(30) Foreign Application Priority Data

Mar. 17, 2022 (JP) .................................. 2022-042589

(51) Int. Cl.
B62D 1/185 (2006.01)
B62D 1/187 (2006.01)
B62D 1/184 (2006.01)

(52) U.S. Cl.
CPC ............. B62D 1/185 (2013.01); B62D 1/184 (2013.01); B62D 1/187 (2013.01)

(58) Field of Classification Search
CPC ......... B62D 1/187; B62D 1/184; B62D 1/185
See application file for complete search history.

(56) References Cited

U.S. PATENT DOCUMENTS

| 10,654,512 | B2 * | 5/2020 | Osawa | B62D 1/184 |
|---|---|---|---|---|
| 2012/0312117 | A1 * | 12/2012 | Maniwa | B62D 1/184 74/493 |
| 2016/0059879 | A1 * | 3/2016 | Tagaya | B62D 1/184 74/493 |
| 2016/0311459 | A1 * | 10/2016 | Takahashi | B62D 1/185 |
| 2018/0251148 | A1 * | 9/2018 | Osawa | B62D 1/195 |
| 2018/0251149 | A1 * | 9/2018 | Osawa | B62D 1/185 |
| 2018/0362069 | A1 * | 12/2018 | Sugiura | B62D 1/184 |
| 2019/0047608 | A1 * | 2/2019 | Ishikawa | B62D 1/184 |
| 2019/0152506 | A1 * | 5/2019 | Shiroishi | B62D 1/184 |
| 2019/0152507 | A1 * | 5/2019 | Shiroishi | B62D 1/184 |
| 2019/0152510 | A1 * | 5/2019 | Shiroishi | B62D 1/189 |
| 2019/0152511 | A1 * | 5/2019 | Shiroishi | B62D 1/192 |
| 2020/0039565 | A1 * | 2/2020 | Harada | B62D 1/187 |
| 2020/0207400 | A1 * | 7/2020 | Sakuda | B62D 1/195 |

(Continued)

FOREIGN PATENT DOCUMENTS

| CN | 102985308 | A * | 3/2013 | ............. B62D 1/184 |
|---|---|---|---|---|
| CN | 105383547 | A * | 3/2016 | ............. B62D 1/184 |

(Continued)

Primary Examiner — Nicole T Verley
(74) Attorney, Agent, or Firm — Rankin, Hill & Clark LLP

(57) ABSTRACT

A steering device according to an aspect of the present disclosure includes a column unit, a front bracket, a rear bracket, and a lock mechanism. The lock mechanism includes a rod supported by the column unit so as to be movable in a vertical direction in tilt guide holes in an unlocked state, and an operation portion that is fixed to a first side end portion of a rod in a right-left direction and that is used to operate of the rod. The first through-hole includes a first straight portion and a first tapered portion. The second through-hole includes a second straight portion and a second tapered portion.

14 Claims, 10 Drawing Sheets

(56) References Cited

U.S. PATENT DOCUMENTS

2020/0317253 A1* 10/2020 Huber .................... B62D 1/195
2021/0009186 A1    1/2021 Sugishita

FOREIGN PATENT DOCUMENTS

| | | | | | |
|---|---|---|---|---|---|
| CN | 112744284 | A | * | 5/2021 | ............. B62D 1/184 |
| CN | 114715259 | A | * | 7/2022 | |
| CN | 116022221 | A | * | 4/2023 | ............... B62D 1/18 |
| DE | 102021133119 | A1 | * | 7/2022 | ............. B62D 1/184 |
| EP | 2532564 | A1 | * | 12/2012 | ............. B62D 1/184 |
| EP | 3138757 | A1 | * | 3/2017 | ............. B62D 1/184 |
| EP | 3674173 | A1 | * | 7/2020 | ............. B62D 1/16 |
| JP | 2017185857 | A | * | 10/2017 | |
| JP | 2018202963 | A | * | 12/2018 | |
| JP | 6648632 | B2 | * | 2/2020 | |
| WO | WO-2014108676 | A1 | * | 7/2014 | ............. B62D 1/184 |
| WO | WO-2015170110 | A1 | * | 11/2015 | ............. B62D 1/184 |
| WO | WO-2017057754 | A1 | * | 4/2017 | ............. B62D 1/184 |
| WO | WO-2017094877 | A1 | * | 6/2017 | ............. B62D 1/184 |
| WO | WO-2017135384 | A1 | * | 8/2017 | ............. B62D 1/184 |
| WO | WO-2018016491 | A1 | * | 1/2018 | ............. B62D 1/184 |
| WO | 2019/189473 | A1 | | 10/2019 | |

* cited by examiner

STEERING DEVICE

BACKGROUND OF THE INVENTION

Field of the Invention

The present disclosure relates to a steering device.

Priority is claimed on Japanese Patent Application No. 2022-042589, filed on Mar. 17, 2022, the content of which is incorporated herein by reference.

Description of Related Art

In some cases, a steering device has a tilt function of adjusting the vertical position of a steering shaft in accordance with a difference in body size between drivers or a driving posture. In the steering device, the steering shaft is held by a column unit so as to be rotatable around an axis extending along a front-rear direction. A front end portion of the column unit is supported by a front bracket so as to be rotatable around an axis extending along a right-left direction. A rear end portion of the column unit is supported by a rear bracket via a rod. A tilt guide hole that extends in a vertical direction is formed in the rear bracket. The rod is inserted into the tilt guide hole through a through-hole of the column unit. In the case of the steering device, the vertical position of the column unit (steering shaft) changes with the rod moving upward or downward in the tilt guide hole due to rotation with respect to the front bracket.

A lock mechanism is installed in the steering device having the tilt function. The lock mechanism switches between a locked state in which rotation of the column unit with respect to the front bracket is restricted and an unlocked state in which the rotation of the column unit with respect to the front bracket is allowed (for example, PCT International Publication No. WO2019/189473).

An operation lever for operation of the rod is attached to a first side end portion of the rod in the right-left direction. Therefore, the first side end portion of the rod is inclined downward, to a degree corresponding to a gap between the rod and the through-hole, because of the weight of the operation lever. Particularly, a draft angle is generally set for the through-hole formed in the column unit so that mold-release characteristics at the time of the molding of the column unit are improved.

That is, the through-hole is formed in a tapered shape of which the inner diameter gradually increases from an inner side toward an outer side in the right-left direction. Therefore, a gap is likely to be formed between an inner peripheral surface of the through-hole and an outer peripheral surface of the rod. There is a problem that wobbling of the rod and vibration or noise attributable to the wobbling are likely to occur in a case where a tilting operation is performed in such a state.

For example, disclosed in PCT International Publication No. WO2019/189473 is a configuration in which the rod is supported by a sleeve provided in the through-hole. However, the configuration in PCT International Publication No. WO2019/189473 is a configuration in which the column unit is separately provided with the sleeve, which may result in an increase in the number of components or an increase in the number of man-hours for assembly.

SUMMARY OF THE INVENTION

The present disclosure provides a steering device with which it is possible to suppress wobbling of a rod and to perform a tilting operation smoothly while suppressing an increase in the number of components or an increase in the number of man-hours for assembly.

In order to solve the above-described problems, aspects as follows have been adopted in the present disclosure.

(1) A steering device according to one aspect of the present disclosure includes: a column unit configured to support a steering shaft such that the steering shaft is rotatable around a first axis extending along a front-rear direction; a front bracket configured to support the column unit such that the column unit is rotatable around a second axis extending along a right-left direction, the front bracket being attached to a vehicle body; a rear bracket that includes side plate portions and that is attached to the vehicle body behind the front bracket, the side plate portions being positioned on both sides in the right-left direction with respect to the column unit and being provided with tilt guide holes formed to extend in a vertical direction; and a lock mechanism configured to switch between a locked state in which the column unit is restricted from moving around the second axis with respect to the front bracket and an unlocked state in which the column unit is allowed to move around the second axis with respect to the front bracket. The column unit includes a first fastening portion that includes a first through-hole penetrating the first fastening portion in the right-left direction and that is provided on a first side in the right-left direction with respect to the first axis, and a second fastening portion that includes a second through-hole penetrating the second fastening portion in the right-left direction, that is provided on a second side in the right-left direction with respect to the first axis, and that approaches the first fastening portion or is separated from the first fastening portion as the lock mechanism transitions between the locked state or the unlocked state, the lock mechanism includes a rod configured to penetrate the first through-hole, the second through-hole, and the tilt guide holes in the right-left direction and supported by the column unit so as to be movable in the vertical direction in the tilt guide holes in the unlocked state, and an operation portion that is fixed to a first side end portion of the rod in the right-left direction and that is used to operate of the rod, the first through-hole includes a first straight portion that linearly extends in the right-left direction at least a portion positioned below the rod, and a first tapered portion that is a portion excluding the first straight portion and at which an inner diameter of the first through-hole gradually increases toward a first side in the right-left direction, and the second through-hole includes a second straight portion that linearly extends in the right-left direction at least a portion positioned above the rod, and a second tapered portion that is a portion excluding the second straight portion and at which an inner diameter of the second through-hole gradually increases toward a second side in the right-left direction.

According to this aspect, even in a case where the first side end portion of the rod in the right-left direction is inclined downward because of the weight of the operation portion in the unlocked state, inclination of the rod between the first straight portion and the second straight portion can be restricted. Accordingly, wobbling of the rod can be suppressed and vibration of the rod at the time of the tilting operation or the like, noise generated by the rod coming into contact with the rear bracket or the like because of the vibration, or the like can be suppressed, for example. As a result, a smooth tilting operation can be realized.

Furthermore, in this aspect, the above-described effects are achieved by means of the shapes of the through-holes of the column unit and thus it is possible to suppress an increase in the number of components or an increase in the number of man-hours for assembly in comparison with a case where a separate sleeve is provided in a through-hole as in the related art.

(2) In the steering device according to the aspect (1), it is preferable that the lock mechanism includes a drive cam that includes a cam portion and that is fixed to the first side end portion of the rod in the right-left direction, and a driven cam that includes a cam follower portion sliding on the cam portion as the rod rotates and that faces the drive cam in the right-left direction at a position outside one of the side plate portions that is disposed on the first side in the right-left direction with respect to the first fastening portion.

According to this aspect, the angle of inclination of the rod (an angle formed between an axis of the rod and the right-left direction) can be made small in comparison with the related art and thus a load acting between the driven cam and the side plate portion can be reduced. As a result, it is possible to reduce the frictional resistance acting when the driven cam slides on the outer surface of the side plate portion at the time of a tilting operation. As a result, a smoother tilting operation can be realized.

(3) In the steering device according to the aspect (1) or (2), it is preferable that the first straight portion is formed over an entire circumference of a second side end portion of the first through-hole in the right-left direction, and the second straight portion is formed over an entire circumference of a first side end portion of the second through-hole in the right-left direction.

According to this aspect, the straight portions are formed over the entire circumferences of inner end portions of the through-holes in the right-left direction. Therefore, it is possible to reduce a difference in circumferential areas of the straight portions between steering devices at the time of the molding of the column unit. In addition, wobbling of the rod in the vertical direction can be more easily suppressed.

(4) In the steering device according to any one of the aspects (1) to (3), it is preferable that the column unit includes an outer column that includes the first fastening portion and the second fastening portion and that has a tubular shape, and an inner column inserted into the outer column so as to be movable forward and backward and configured to rotatably support the steering shaft, a hanger bracket is provided at a portion of the inner column that is positioned between the first fastening portion and the second fastening portion, a telescopic guide hole into which the rod is inserted and that extends in the front-rear direction is formed in the hanger bracket, and a slide guide that includes shock absorption portions is mounted on the rod, the shock absorption portions being positioned in the telescopic guide hole while being on both sides in at least the front-rear direction with respect to the rod.

According to this aspect, direct contact between a lock bolt and the hanger bracket can be suppressed at a maximum contraction position or a maximum expansion position of the column unit. Therefore, it is possible to suppress generation of noise at the time of the telescopic operation.

(5) In the steering device according to the aspect (4), it is preferable that the slide guide includes an insertion hole into which the rod is inserted, and an inner diameter of the insertion hole gradually decreases toward the second fastening portion from the first fastening portion.

According to this aspect, wobbling between the rod and the slide guide can be suppressed. Therefore, inclination of the rod in the unlocked state can be more easily suppressed.

(6) In the steering device according to the aspect (4) or (5), it is preferable that the slide guide includes an insertion hole into which the rod is inserted, and a supporting portion configured to support the rod from below is formed at the insertion hole.

According to this aspect, the rod is supported from below by an inner peripheral edge of the insertion hole. Therefore, inclination of the rod in the unlocked state can be more easily suppressed.

(7) In the steering device according to the aspect (6), it is preferable that a central axis of the insertion hole is disposed to be offset from a central axis of the rod while being disposed above the central axis of the rod, and a portion of an inner peripheral edge of the insertion hole that is positioned below the rod constitutes the supporting portion.

According to this aspect, the central axis of the insertion hole is disposed to be offset from the central axis of the rod while being disposed above the central axis of the rod. Accordingly, the portion of the inner peripheral edge of the insertion hole that is positioned below the rod can function as the supporting portion. Therefore, it is possible to reduce a difference in dimensions of the supporting portion between steering devices at the time of the molding of the slide guide.

(8) In the steering device according to any one of the aspects (5) to (7), it is preferable that the hanger bracket includes a bracket side wall in which the telescopic guide hole is formed, and a bracket bottom wall that extends in the right-left direction from a lower end edge of the bracket side wall, the slide guide includes a guide side wall that includes the insertion hole and that is disposed on the first side in the right-left direction with respect to the bracket side wall, and a guide bottom wall that extends in the right-left direction from a lower end edge of the guide side wall and that is disposed below the bracket bottom wall, and an urging member configured to urge the column unit upward via the guide bottom wall is provided between the rear bracket and the column unit.

According to this aspect, the slide guide is urged upward together with the column unit and thus wobbling between the slide guide and the hanger bracket can be suppressed. As a result, wobbling of the rod with respect to the hanger bracket is suppressed and thus inclination of the rod in the unlocked state can be more easily suppressed.

According to the aspects described above, it is possible to perform a tilting operation smoothly while suppressing an increase in the number of components or an increase in the number of man-hours for assembly.

DETAILED DESCRIPTION OF THE INVENTION

Figure 1:
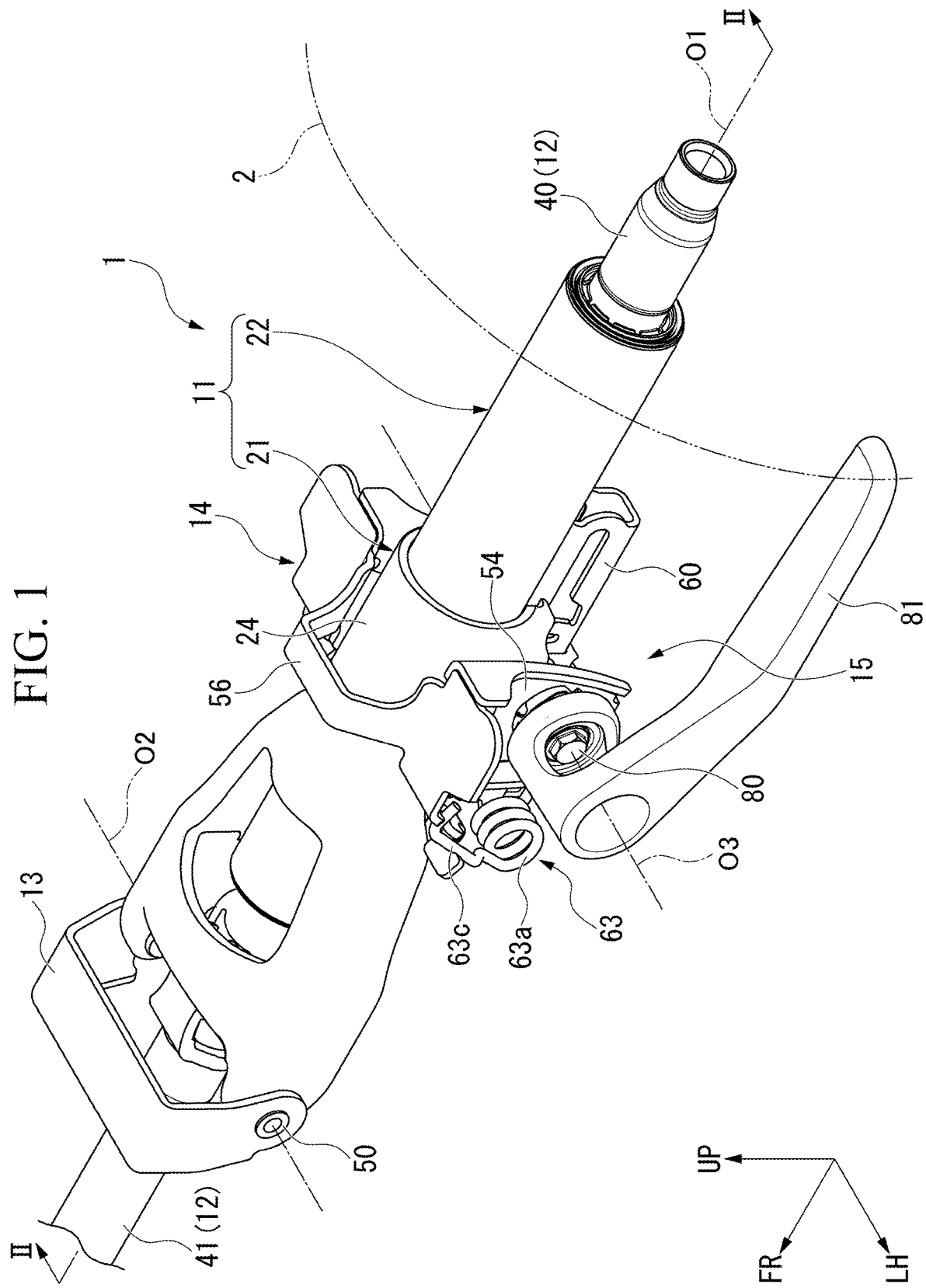
FIG. 1 is a perspective view of a steering device according to an embodiment.

Next, an embodiment of the present disclosure will be described with reference to the drawings. In the embodiment and a modification example which will be described below, the corresponding configurations may be given the same reference numerals and the description thereof may be omitted. In the following description, for example, an expression of relative or absolute arrangement such as "parallel", "orthogonal", "centered", and "coaxial" shall not be construed as indicating only the arrangement in a strict literal sense, but also includes a state where the arrangement is relatively displaced by a tolerance, or by the angle or the distance whereby it is possible to achieve the same function.

[Steering Device 1]

FIG. 1 is a perspective view of a steering device 1.

As shown in FIG. 1, the steering device 1 is installed in a vehicle. The steering device 1 adjusts the steering angles of wheels as a steering wheel 2 is rotated.

The steering device 1 includes a column unit 11, a steering shaft 12, brackets (a front bracket 13 and a rear bracket 14), and an adjustment mechanism 15. Each of the column unit 11 and the steering shaft 12 is formed in a tubular shape disposed on a first axis O1. Therefore, in the following description, a direction in which the first axis O1 of the column unit 11 and the steering shaft 12 extends may be simply referred to as a shaft axial direction, a direction orthogonal to the first axis O1 may be referred to as a shaft radial direction, and a direction around the first axis O1 may be referred to as a shaft circumferential direction.

The steering device 1 of the present embodiment is installed in the vehicle in a state where the first axis O1 is inclined with respect to a front-rear direction. The first axis O1 of the steering device 1 extends to become closer to an upper side toward a rear side. However, in the following description, for the sake of convenience, the shaft axial direction will be referred to as the front-rear direction. In the steering device 1, a direction toward the steering wheel 2 in the front-rear direction will be simply referred to as a rearward direction, and a direction toward a side opposite to the steering wheel 2 will be simply referred to as a frontward direction (an arrow FR). Of the shaft radial directions, a vertical direction in a state where the steering device 1 is attached to the vehicle will be simply referred to as a vertical direction (an arrow UP represents an upward direction) and a right-left direction will be simply referred to as a right-left direction.

<Column Unit 11>

Figure 2:
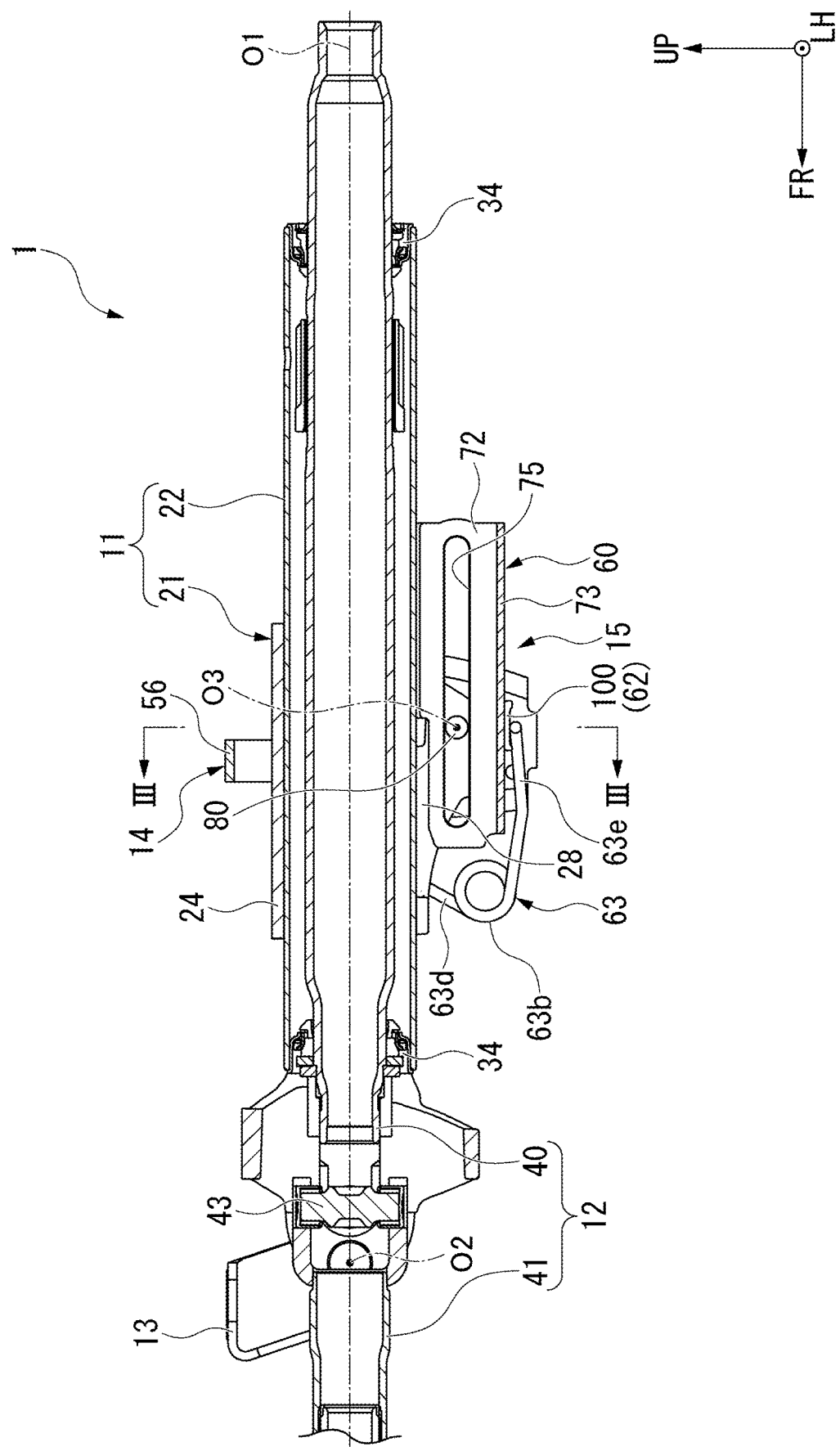
FIG. 2 is a cross-sectional view corresponding to line II-II of FIG. 1.
Figure 3:
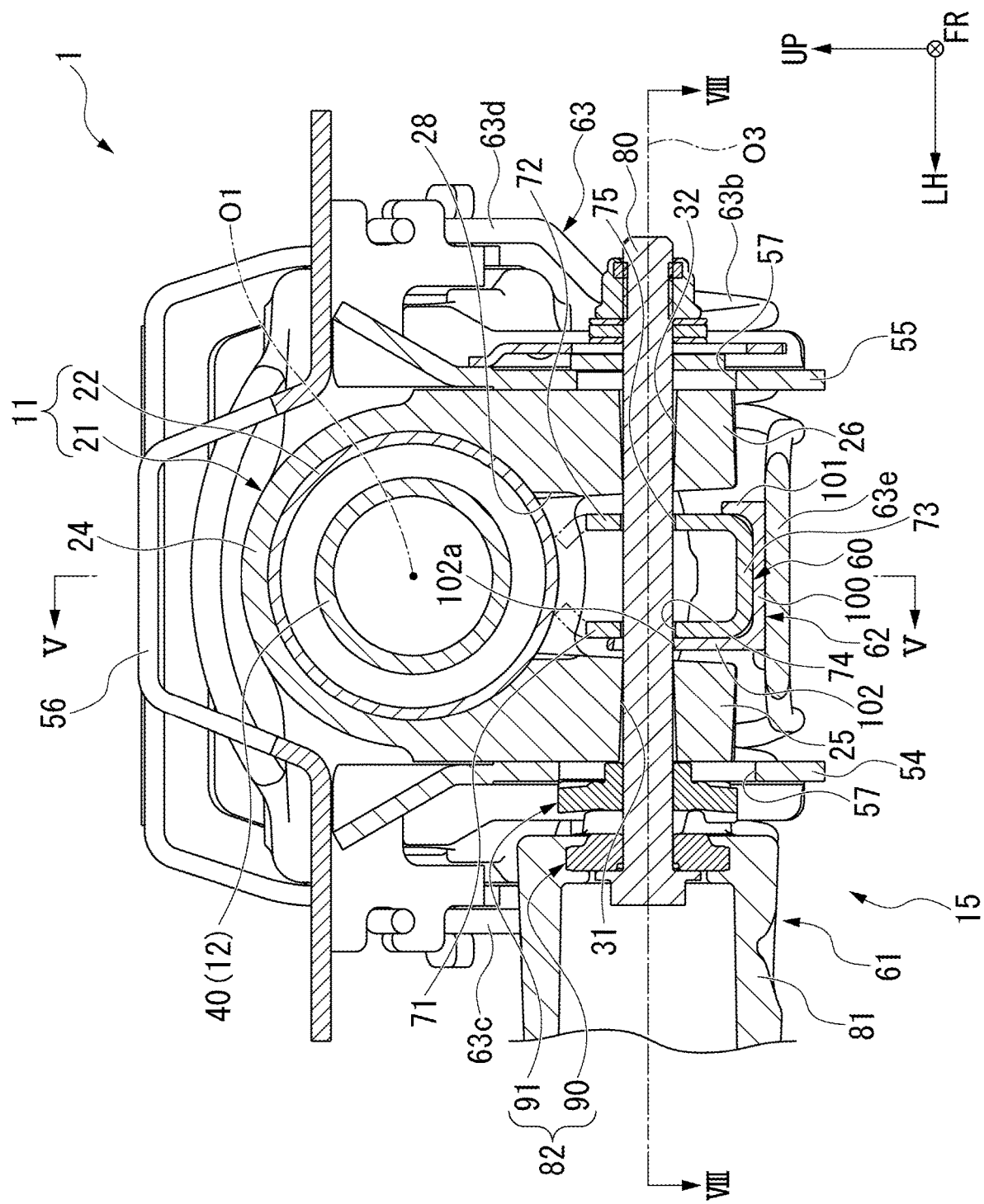
FIG. 3 is a cross-sectional view corresponding to line III-III of FIG. 2.

FIG. 2 is a cross-sectional view taken along line II-II of FIG. 1. FIG. 3 is a cross-sectional view corresponding to line III-III of FIG. 2.

As shown in FIGS. 1 to 3, the column unit 11 includes an outer column 21 and an inner column 22.

The outer column 21 is attached to a vehicle body via the brackets 13 and 14. The outer column 21 includes a holding tubular portion 24, a first fastening portion 25, and a second fastening portion 26.

The holding tubular portion 24 is formed in a tubular shape extending along the first axis O1. A slit 28 is formed at a portion in the shaft circumferential direction (in the present embodiment, a lower portion of the outer column 21) of a rear portion of the holding tubular portion 24. The slit 28 penetrates the outer column 21 in the vertical direction and is open at a rear end surface of the outer column 21.

As shown in FIG. 3, the fastening portions 25 and 26 extend downward from positions on the holding tubular portion 24 that face each other in the right-left direction with the slit 28 interposed therebetween. A first through-hole 31 that penetrates the first fastening portion 25 in the right-left direction is formed in the first fastening portion 25. A second through-hole 32 that penetrates the second fastening portion 26 in the right-left direction is formed in the second fastening portion 26. The shape of each of the through-holes 31 and 32 will be described later.

As shown in FIG. 2, the inner column 22 is formed in a tubular shape extending along the first axis O1. The outer diameter of the inner column 22 is smaller than the inner diameter of the holding tubular portion 24. The inner column 22 is inserted into the holding tubular portion 24. The inner column 22 is configured to be movable in the front-rear direction with respect to the holding tubular portion 24. In the inner column 22, a bearing 34 is attached to each of a front end portion and a rear end portion by being press-fitted or the like.

<Steering Shaft 12>

The steering shaft 12 includes a rear shaft 40 and a front shaft 41. The rear shaft 40 is inserted into the inner column 22. The rear shaft 40 is supported in the inner column 22 via the bearings 34 so as to be rotatable around the first axis O1. A rear end portion of the rear shaft 40 protrudes rearward through a rear end opening portion of the inner column 22. The steering wheel 2 (refer to FIG. 1) is connected to the rear end portion of the rear shaft 40.

The front shaft 41 is connected to a front end portion of the rear shaft 40 via a first universal joint 43. That is, the front shaft 41 is configured to be swingable with respect to the rear shaft 40. The front end portion of the front shaft 41 is connected to a steering gear box (not shown) via a second universal joint (not shown). In the case of the steering device 1, the wheels are steered when a rotational force of the steering shaft 12 is transmitted to the steering gear box.

<Brackets 13 and 14>

As shown in FIG. 1, the front bracket 13 connects the outer column 21 and the vehicle body to each other via a pivot shaft 50. The front bracket 13 is formed in a U-like shape that is open to a lower side in a front view as seen in the front-rear direction. The front bracket 13 surrounds the rear end portion of the outer column 21 on an upper side and both sides in the right-left direction. The outer column 21 is supported by the front bracket 13 so as to be rotatable around a second axis O2 that extends in the right-left direction about the pivot shaft 50.

As shown in FIG. 3, the rear bracket 14 connects the outer column 21 and the vehicle body to each other via a lock bolt (rod) 80 which will be described later. The rear bracket 14 is formed in a U-like shape that is open to the lower side in the front view as seen in the front-rear direction. The rear bracket 14 surrounds the outer column 21 on the upper side and both sides in the right-left direction. The rear bracket 14 includes a first side plate portion 54 that is disposed on a first side in the right-left direction with respect to the column unit 11, a second side plate portion 55 that is disposed on a second side in the right-left direction with respect to the column unit 11, and a bridge portion 56 that connects the side plate portions 54 and 55 to each other.

Figure 4:
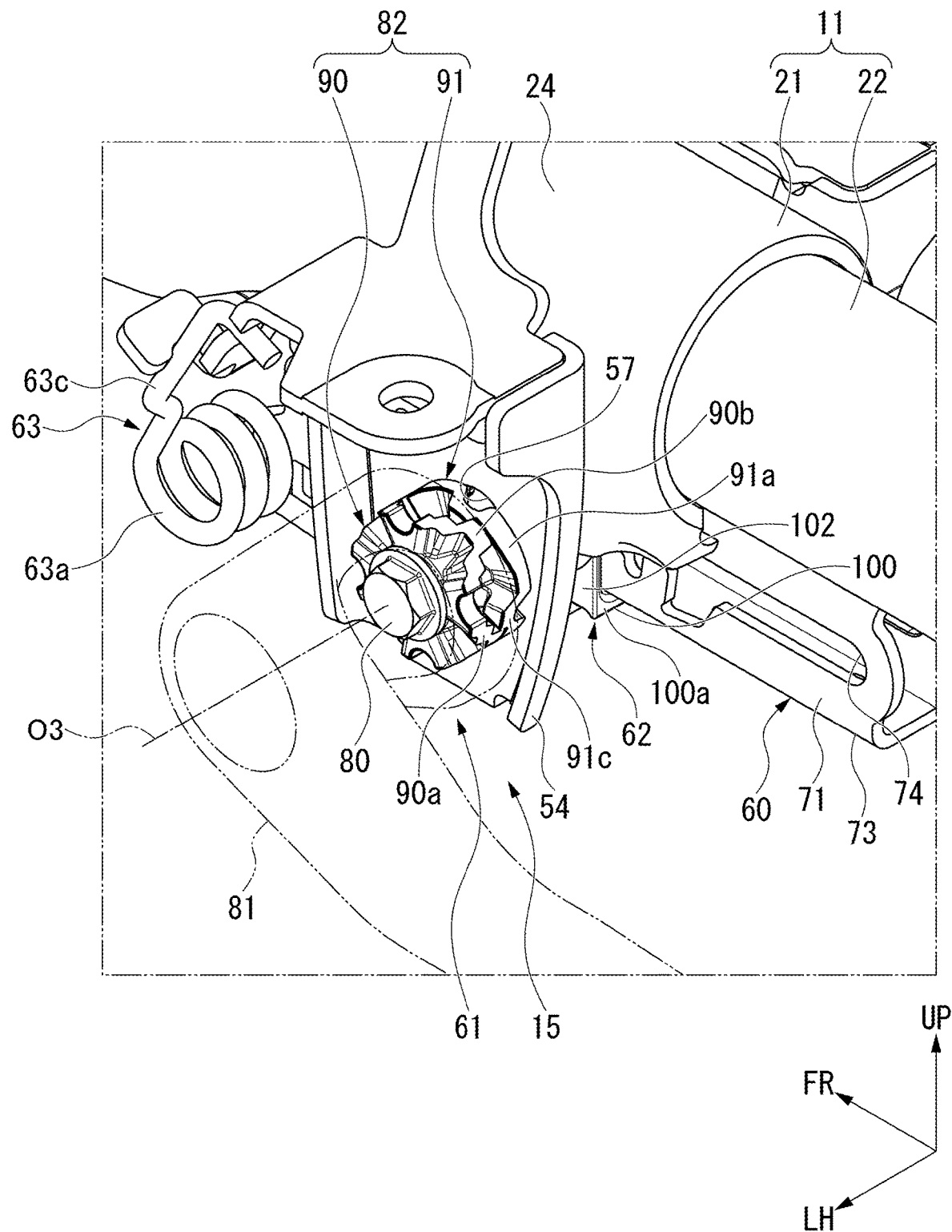
FIG. 4 is a perspective view of the vicinity of an adjustment mechanism.

FIG. 4 is an enlarged perspective view of the vicinity of a lock bolt 80.

As shown in FIGS. 3 and 4, a tilt guide hole 57 that penetrates each of the side plate portions 54 and 55 in the right-left direction is formed in each of the side plate portions 54 and 55. The tilt guide hole 57 is an elongated hole extending in the vertical direction. The tilt guide hole 57 is formed in an arc shape of which the center of curvature is the second axis O2 and that is curved rearward. The lock bolt 80 penetrates the tilt guide holes 57 in the right-left direction. The lock bolt 80 moves upward and downward in the tilt guide holes 57 when the column unit 11 is tilted (at the time of adjustment of the vertical position of the column unit 11 around the second axis O2).

As shown in FIG. 2, the bridge portion 56 connects upper end portions of the side plate portions 54 and 55 to each other. The bridge portion 56 is formed in an arch-like shape that protrudes upward. The bridge portion 56 is positioned on the rotation locus of the column unit 11 when the column unit 11 is tilted. That is, when the column unit 11 is tilted, the column unit 11 approaches the bridge portion 56 from below or is separated from the bridge portion 56.

<Adjustment Mechanism 15>

As shown in FIG. 3 and FIG. 4, the adjustment mechanism 15 adjusts the position (the telescopic position) of the inner column 22 (and the steering shaft 12) with respect to the outer column 21 in the front-rear direction and the vertical position (the tilt position) of the column unit 11 with respect to the front bracket 13 in a direction around the second axis O2. Specifically, the adjustment mechanism 15 includes a hanger bracket 60, a lock mechanism 61, a slide guide 62, and an urging member 63.

The hanger bracket 60 guides the inner column 22 to move forward and backward with respect to the outer column 21. The hanger bracket 60 is downwardly fixed to an outer peripheral surface of the inner column 22. The hanger bracket 60 is formed by, for example, performing presswork on a metal plate. The hanger bracket 60 is formed in a U-like shape that is open to an upper side as seen in the front view. The hanger bracket 60 includes a first facing wall portion (a bracket side wall) 71 and a second facing wall portion (a bracket side wall) 72 that face each other in the right-left direction and a bracket bottom wall 73 that connects lower end edges of the facing wall portions 71 and 72 to each other. Upper end edges of the facing wall portions 71 and 72 are fixed to the inner column 22 through welding or the like.

The hanger bracket 60 is exposed to the outside of the outer column 21 through the slit 28. A first telescopic guide hole 74 that penetrates the first facing wall portion 71 in the right-left direction is formed in the first facing wall portion 71. A second telescopic guide hole 75 that penetrates the second facing wall portion 72 in the right-left direction is formed in the second facing wall portion 72. The guide holes 74 and 75 are disposed to face each other in the right-left direction. The guide holes 74 and 75 are elongated holes of which the longitudinal direction is the front-rear direction. A portion of each of the guide holes 74 and 75 in the front-rear direction overlaps with the through-holes 31 and 32 as seen in the right-left direction.

Figure 5:
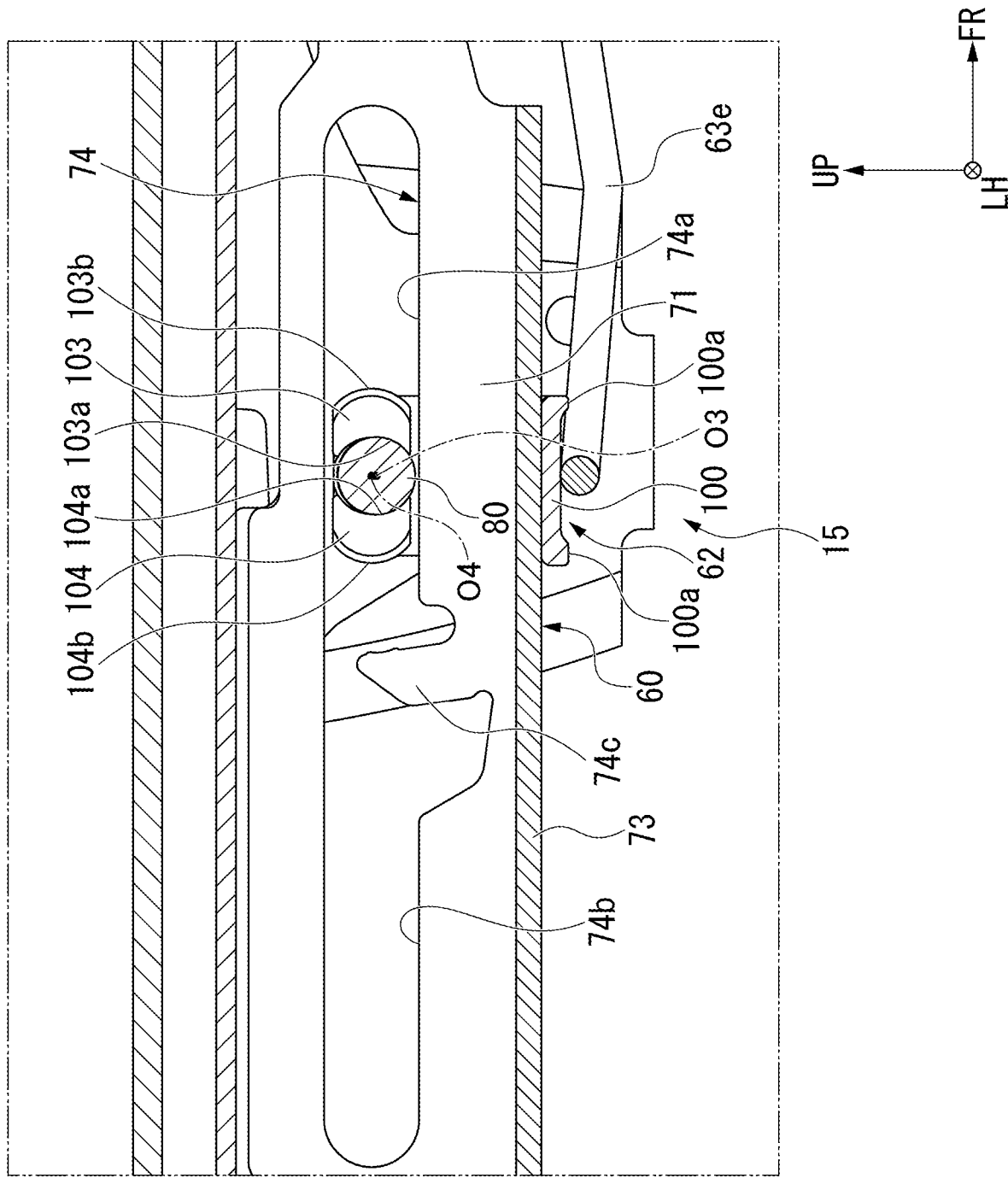
FIG. 5 is a cross-sectional view corresponding to line V-V of FIG. 3.

FIG. 5 is a cross-sectional view corresponding to line V-V of FIG. 3.

As shown in FIG. 5, the first telescopic guide hole 74 includes a telescopic region 74a and a load absorption region 74b connected to a rear side of the telescopic region 74a.

The vertical width of the telescopic region 74a is uniform. In the telescopic region 74a, the lock bolt 80 moves forward and backward as the inner column 22 moves with respect to the outer column 21.

At a lower end edge of the first telescopic guide hole 74, a protruding piece 74c is formed in a boundary between the telescopic region 74a and the load absorption region 74b. The protruding piece 74c is positioned on the locus of movement of the lock bolt 80 in the front-rear direction. The protruding piece 74c restricts a telescopic range since the lock bolt 80 abuts the protruding piece 74c at the time of a telescopic operation. The protruding piece 74c is configured to be tilted rearward with the lower end portion thereof as a fulcrum in a case where impact at the time of a secondary collision is transmitted via the lock bolt 80, for example. In the load absorption region 74b, the protruding piece 74c is tilted as the hanger bracket 60 moves forward relative to the lock bolt 80 so that the load of impact at the time of a secondary collision is alleviated. The protruding piece 74c may protrude downward from an upper end edge of the first telescopic guide hole 74.

As shown in FIG. 2, the second telescopic guide hole 75 has the same length as the first telescopic guide hole 74 (the telescopic region 74a and the load absorption region 74b). The vertical width of the second telescopic guide hole 75 is uniform over the entire length.

As shown in FIG. 4, the lock mechanism 61 includes the lock bolt 80, an operation lever 81, and a cam mechanism 82.

The lock bolt 80 penetrates the side plate portions 54 and 55, the fastening portions 25 and 26, and the hanger bracket 60 in the right-left direction through the tilt guide holes 57, the through-holes 31 and 32, and the telescopic guide holes 74 and 75. At the time of a telescopic operation, the inner column 22 moves forward and backward with respect to the outer column 21 such that the lock bolt 80 moves forward and backward in the telescopic guide holes 74 and 75. At the time of a tilting operation, the lock bolt 80 moves upward and downward together with the column unit 11 by moving upward and downward in the tilt guide holes 57. In the following description, an axis of the lock bolt 80 may be referred to as a third axis O3, a direction orthogonal to the third axis O3 may be referred to as a bolt radial direction, and a direction around the third axis O3 may be referred to as a bolt circumferential direction.

The operation lever 81 extends rearward from the lock bolt 80 in a cantilevered state. A base end portion (a front end portion) of the operation lever 81 is connected to a left side end portion (a first side end portion in the right-left direction) of the lock bolt 80. The operation lever 81 is configured to be rotatable around the third axis O3 together with the lock bolt 80 by being pressed down or pulled up via a tip end portion (a rear end portion).

The cam mechanism 82 is disposed between the operation lever 81 and the first side plate portion 54. The cam mechanism 82 includes a drive cam 90 and a driven cam 91.

The drive cam 90 is formed in a disk-like shape disposed to be coaxial with the third axis O3. The drive cam 90 is fixed to the operation lever 81. That is, the drive cam 90 rotates integrally with the operation lever 81 around the axis O3 as the operation lever 81 is operated. The drive cam 90 includes a drive base 90a and cam portions 90b.

The drive base 90a is formed in a disk-like shape disposed to be coaxial with the third axis O3. The lock bolt 80 penetrates, in the right-left direction, a central portion of the drive base 90a in the bolt radial direction.

The cam portions 90b protrude inward in the right-left direction (toward the driven cam 91) from the drive base 90a. A plurality of the cam portions 90b are formed at intervals in the bolt circumferential direction.

The driven cam 91 is disposed between the first side plate portion 54 and the drive cam 90. The driven cam 91 is formed in a disk-like shape disposed to be coaxial with the axis O3. The driven cam 91 is supported by the first side plate portion 54 in a state where the lock bolt 80 penetrates the driven cam 91. The driven cam 91 includes a driven base 91a, a rotation stopper portion 91b (refer to FIG. 7), and cam follower portions 91c.

The driven base 91a is formed in a disk-like shape disposed to be coaxial with the third axis O3. The lock bolt 80 penetrates, in the right-left direction, a central portion of the driven base 91a in the bolt radial direction.

Figure 7:
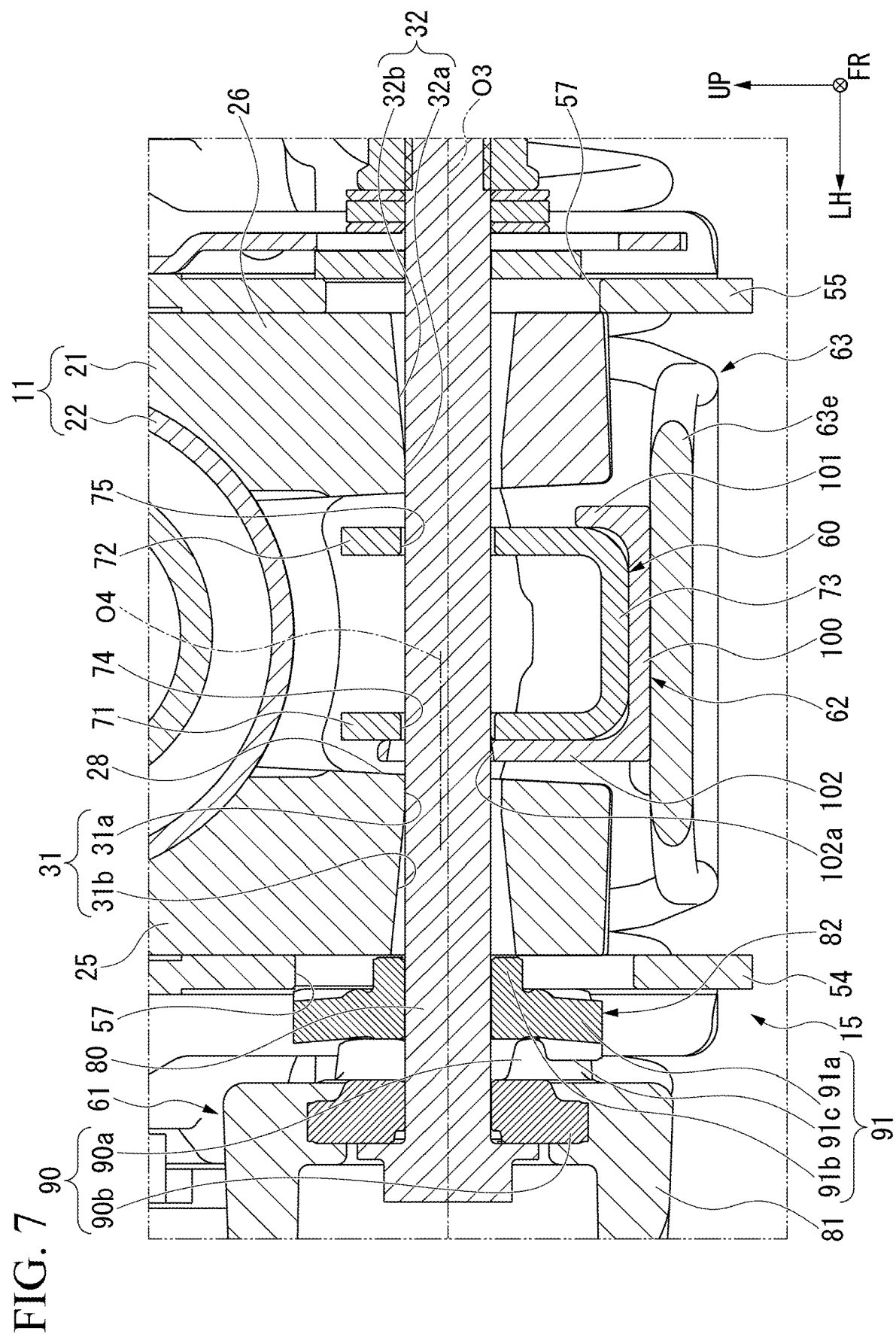
FIG. 7 is an enlarged view of FIG. 3.

As shown in FIG. 7, the rotation stopper portion 91b protrudes inward in the right-left direction from the driven base 91a. The rotation stopper portion 91b is accommodated in the tilt guide hole 57. The rotation stopper portion 91b comes into contact with an inner peripheral edge of the tilt guide hole 57 to restrict the driven cam 91 from rotating with respect to the first side plate portion 54 around the third axis O3.

As shown in FIG. 4, a plurality of the cam follower portions 91c are formed to correspond to the cam portions 90b at intervals in the bolt circumferential direction. The cam follower portions 91c form sliding surfaces on which the cam portions 90b slide as the operation lever 81 rotates. Regarding the cam follower portions 91c, the amount of protrusion of the cam portions 90b from the driven base 91a gradually increases toward one side in the bolt circumferential direction.

The cam mechanism 82 is configured such that the thickness thereof in the right-left direction is changed as the operation lever 81 is rotated and thus the cam portions 90b slide on the cam follower portions 91c. The steering device 1 is configured such that the fastening portions 25 and 26 approach each other or are separated from each other in the right-left direction via the side plate portions 54 and 55 (a dimension of the slit 28 in the right-left direction is increased or decreased) when the thickness of the cam mechanism 82 is changed. In a case where the operation lever 81 is rotated toward the one side in the bolt circumferential direction, the thickness of the cam mechanism 82 is increased. Then, the fastening portions 25 and 26 approach each other together with the side plate portions 54 and 55 and thus the diameter of the holding tubular portion 24 is decreased. Accordingly, the inner column 22 is fastened by the holding tubular portion 24 and the telescopic operation and the tilting operation are restricted (a locked state). In a case where the operation lever 81 is rotated to the other side in the bolt circumferential direction in the locked state, the thickness of the cam mechanism 82 is decreased. Then, the fastening portions 25 and 26 are separated from each other together with the side plate portions 54 and 55 and thus the diameter of the holding tubular portion 24 is increased. Accordingly, the inner column 22 fastened by the holding tubular portion 24 is released and the telescopic operation and the tilting operation are allowed.

Figure 6:
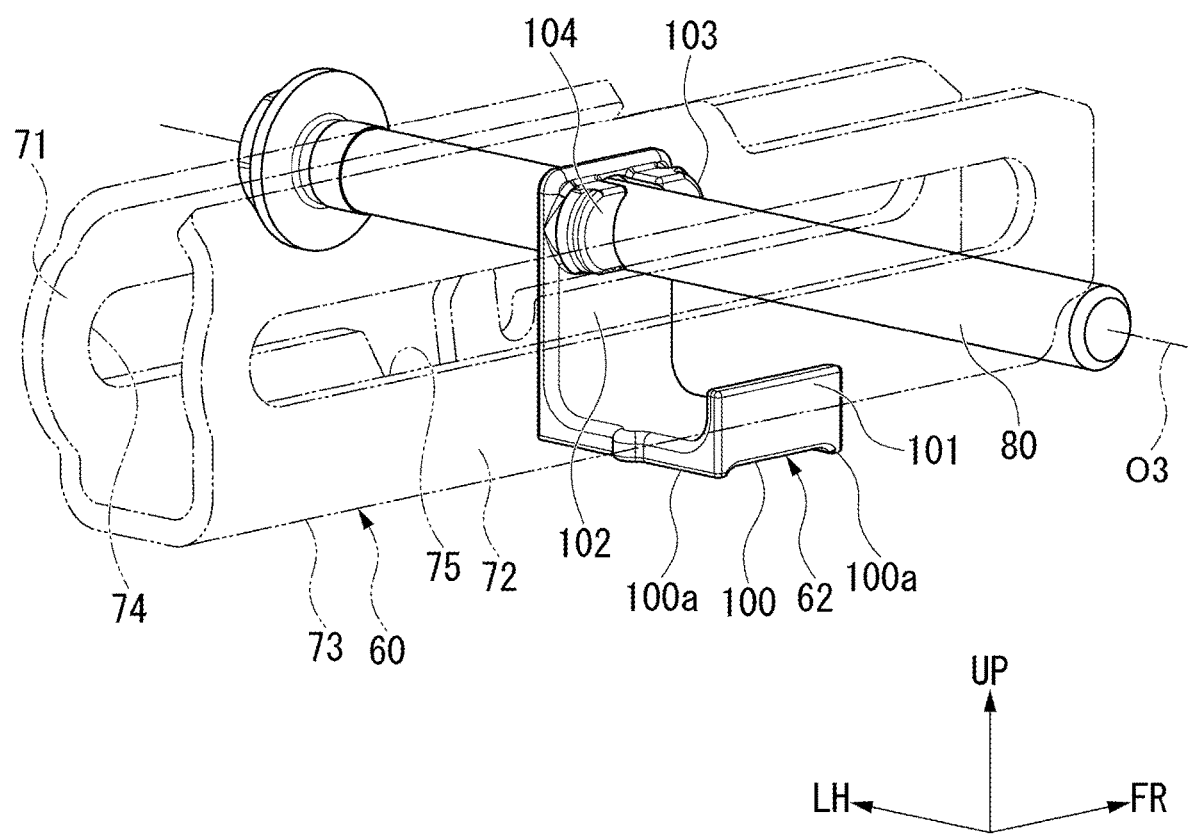
FIG. 6 is a perspective view of the vicinity of a slide guide.

FIG. 6 is a perspective view of the vicinity of the slide guide 62.

As shown in FIG. 6, the slide guide 62 is mounted over the lock bolt 80 and the hanger bracket 60. The slide guide 62 is formed of a material (for example, a resin material) that is elastically deformable and that has a coefficient of friction smaller than that of the lock bolt 80. The slide guide 62 is formed in an L-like shape as seen in the front view. The slide guide 62 includes a guide bottom wall 100, a rising piece 101, a guide side wall 102, a front shock absorption portion 103, and a rear shock absorption portion 104.

The guide bottom wall 100 extends in the right-left direction below the bracket bottom wall 73. The guide bottom wall 100 abuts the bracket bottom wall 73 from below. Ribs 100a protruding downward are formed at both of front and rear end edges of the guide bottom wall 100. The ribs 100a extend in the right-left direction at both of the front and rear end edges of the guide bottom wall 100.

The rising piece 101 extends upward from a second side end edge of the guide bottom wall 100 in the right-left direction. The rising piece 101 approaches or abuts the second facing wall portion 72 from an outer side in the right-left direction. An upper end edge of the rising piece 101 is positioned below a lower end edge of the second telescopic guide hole 75.

Figure 8:
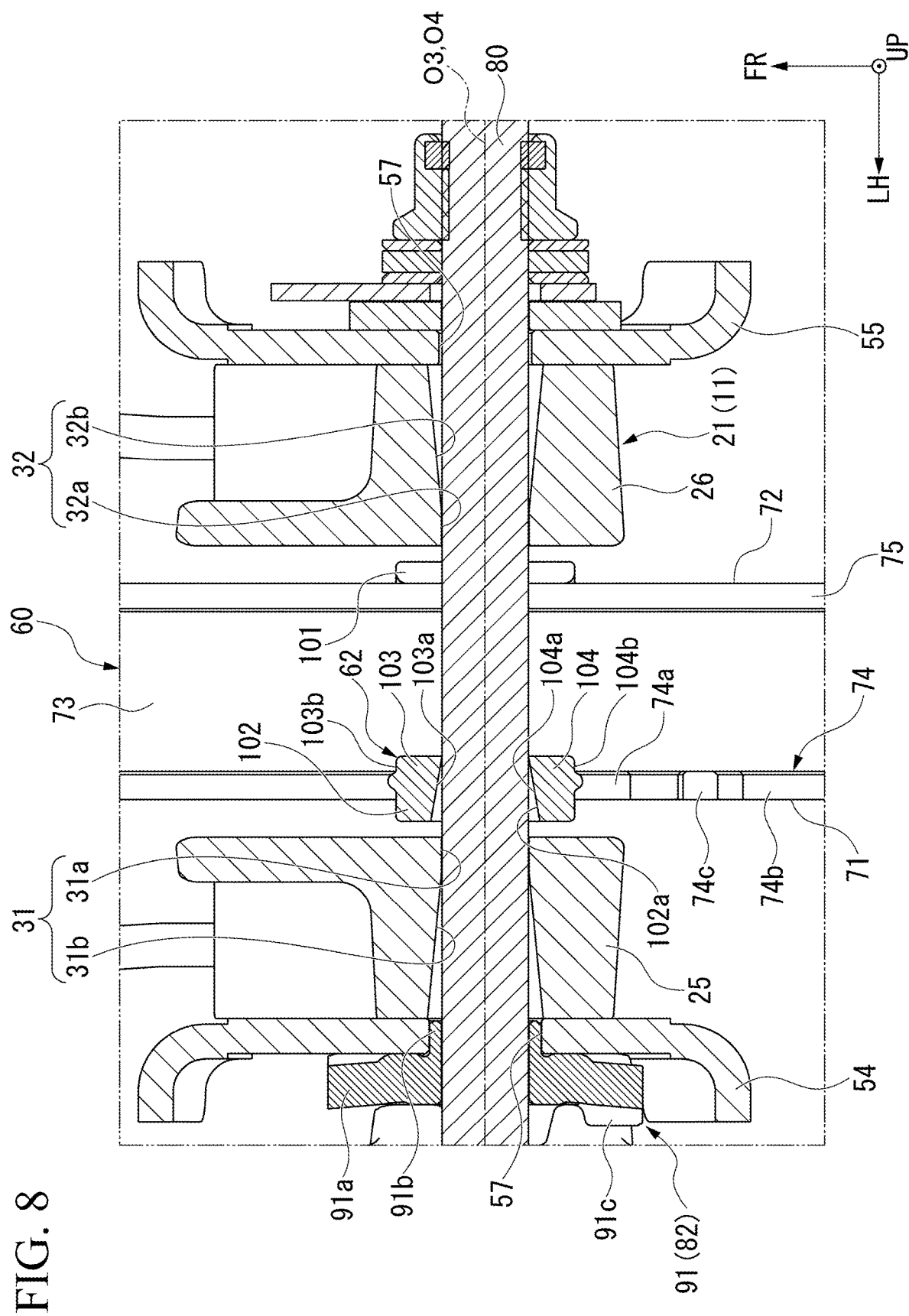
FIG. 8 is a cross-sectional view corresponding to line VIII-VIII of FIG. 3.

FIG. 7 is an enlarged view of a main portion of FIG. 3. FIG. 8 is a cross-sectional view corresponding to line VIII-VIII of FIG. 3.

As shown in FIGS. 7 and 8, the guide side wall 102 extends upward from a first side end edge of the guide bottom wall 100 in the right-left direction. The guide side wall 102 approaches or abuts the first facing wall portion 71 from the outer side in the right-left direction. That is, the guide bottom wall 100, the rising piece 101, and the guide side wall 102 surround the hanger bracket 60 from below and from both of left and right sides. An upper end edge of the guide side wall 102 is positioned above an upper end edge of the first telescopic guide hole 74.

An insertion hole 102a is formed in the guide side wall 102 at a position overlapping the first telescopic guide hole 74 as seen in the right-left direction. The insertion hole 102a is formed in a tapered shape of which the inner diameter gradually decreases from the outer side toward an inner side in the right-left direction. A central axis O4 of the insertion hole 102a is disposed to be offset from the third axis O3 while being disposed above the third axis O3. A lowermost end of the insertion hole 102a is positioned above the lower end edge of the first telescopic guide hole 74 and is positioned above lowermost ends of the through-holes 31 and 32. The lock bolt 80 penetrates the insertion hole 102a between the first through-hole 31 and the first telescopic guide hole 74. In the insertion hole 102a, the lock bolt 80 is supported from below by a lower end edge (a portion including the lowermost end) of the insertion hole 102a.

As shown in FIGS. 5 and 8, the front shock absorption portion 103 alleviates a load at the time of contact since the lock bolt 80 comes into contact with a front end edge of the first telescopic guide hole 74 via the front shock absorption portion 103 when the column unit 11 moves to a maximum contraction position at the time of the telescopic operation. The front shock absorption portion 103 protrudes inward in the right-left direction from a portion of the guide side wall 102 that is positioned ahead of the insertion hole 102a. In the first telescopic guide hole 74, the front shock absorption portion 103 is interposed between the front end edge of the first telescopic guide hole 74 and the lock bolt 80. Each front shock absorption portion 103 is formed in a crescent shape as seen in the right-left direction.

A surface (hereinafter, will be referred to as an inner peripheral surface 103a) of the front shock absorption portion 103 that faces a rear side is formed in an arc shape of which the center is the central axis O4 and that is curved forward as seen in the right-left direction. In the present embodiment, the inner peripheral surface 103a of the front shock absorption portion 103 is smoothly connected to an inner peripheral surface of the insertion hole 102a. That is, the inner peripheral surface 103a of the front shock absorption portion 103 is formed in a tapered shape that extends to become closer to the central axis O4 toward the inner side in the right-left direction. A surface (hereinafter, will be referred to as an outer peripheral surface 103b) of the front shock absorption portion 103 that faces a front side is formed in an arc shape that extends in imitation of the front end edge of the first telescopic guide hole 74 as seen in the right-left direction.

An upper end surface of the front shock absorption portion 103 connects upper ends of the inner peripheral surface 103a and the outer peripheral surface 103b of the front shock absorption portion 103 to each other. The upper end surface of the front shock absorption portion 103 is formed as a flat surface orthogonal to the vertical direction. It is preferable that the upper end surface of the front shock absorption portion 103 is separated from the upper end edge of the first telescopic guide hole 74 while being disposed below the upper end edge.

A lower end surface of the front shock absorption portion 103 connects lower ends of the inner peripheral surface 103a and the outer peripheral surface 103b of the front shock absorption portion 103 to each other. The lower end surface of the front shock absorption portion 103 is formed as a flat surface orthogonal to the vertical direction. It is preferable that the lower end surface of the front shock absorption portion 103 is separated from the lower end edge of the first telescopic guide hole 74 while being disposed above the lower end edge.

The rear shock absorption portion 104 alleviates a load at the time of collision since the lock bolt 80 collides with the protruding piece 74c via the rear shock absorption portion 104 when the column unit 11 moves to a maximum expansion position at the time of the telescopic operation. As seen in the right-left direction, the rear shock absorption portion 104 is formed to be line-symmetrical with respect to a line of symmetry that passes through the central axis O4 and that extends along the vertical direction. However, the shock absorption portions 103 and 104 may be formed asymmetrically.

The rear shock absorption portion 104 protrudes inward in the right-left direction from a portion of the guide side wall 102 that is positioned behind the insertion hole 102a. In the first telescopic guide hole 74, the rear shock absorption portion 104 is interposed between the protruding piece 74c and the lock bolt 80. A surface (hereinafter, will be referred to as an inner peripheral surface 104a) of the rear shock absorption portion 104 that faces the front side is formed in an arc shape of which the center is the central axis O4 and that is curved forward as seen in the right-left direction. In the present embodiment, the inner peripheral surface 104a of the rear shock absorption portion 104 is smoothly connected to the inner peripheral surface of the insertion hole 102a. That is, the inner peripheral surface 104a of the rear shock absorption portion 104 is formed in a tapered shape that extends to become closer to the central axis O4 toward the inner side in the right-left direction. Therefore, the inner peripheral surface 103a of the front shock absorption portion 103 and the inner peripheral surface 104a of the rear shock absorption portion 104 become closer to an outer peripheral surface of the lock bolt 80 toward the inner side in the right-left direction. In the present embodiment, the inner peripheral surface 103a of the front shock absorption portion 103 and the inner peripheral surface 104a of the rear shock absorption portion 104 are formed to have the same radius of curvature.

A surface (hereinafter, will be referred to as an outer peripheral surface 104b) of the rear shock absorption portion 104 that faces the rear side is formed in an arc shape that extends in imitation of a rear end edge of the first telescopic guide hole 74 as seen in the right-left direction. In the present embodiment, the outer peripheral surface 103b of the front shock absorption portion 103 and the outer peripheral surface 104b of the rear shock absorption portion 104 are formed to have the same radius of curvature.

An upper end surface of the rear shock absorption portion 104 connects upper ends of the inner peripheral surface and the outer peripheral surface of the rear shock absorption portion 104 to each other. The upper end surface of the rear shock absorption portion 104 is formed as a flat surface orthogonal to the vertical direction. It is preferable that the upper end surface of the rear shock absorption portion 104 is separated from the upper end edge of the first telescopic guide hole 74 while being disposed below the upper end edge.

A lower end surface of the rear shock absorption portion 104 connects lower ends of the inner peripheral surface and the outer peripheral surface of the rear shock absorption portion 104 to each other. The lower end surface of the rear shock absorption portion 104 is formed as a flat surface orthogonal to the vertical direction. It is preferable that the lower end surface of the rear shock absorption portion 104 is separated from the lower end edge of the first telescopic guide hole 74 while being disposed above the lower end edge.

As shown in FIGS. 2 to 4, the urging member 63 is interposed between the rear bracket 14 and the slide guide 62. The urging member 63 urges the column unit 11 upward via the slide guide 62. The urging member 63 is, for example, a double torsion spring. That is, the urging member 63 includes a first coil portion 63a, a second coil portion 63b (refer to FIG. 2), a first connection portion 63c, a second connection portion 63d, and an intermediate portion 63e.

The first coil portion 63a is disposed ahead of the first side plate portion 54 in a state where the axial direction thereof is parallel to the right-left direction.

The second coil portion 63b is disposed ahead of the second side plate portion 55 in a state where the axial direction thereof is parallel to the right-left direction. That is, the coil portions 63a and 63b are disposed on both sides in the right-left direction with the slit 28 interposed therebetween.

The first connection portion 63c extends upward from an outer end portion of the first coil portion 63a in the right-left direction. A tip end portion of the first connection portion 63c is connected to an upper portion of the first side plate portion 54.

The second connection portion 63d extends upward from an outer end portion of the second coil portion 63b in the right-left direction. A tip end portion of the second connection portion 63d is connected to an upper portion of the second side plate portion 55.

The intermediate portion 63e connects inner end portions of the first coil portion 63a and the second coil portion 63b in the right-left direction to each other. The intermediate portion 63e is formed in a U-like shape that is open to a front side as seen in the vertical direction. A rear end portion of the intermediate portion 63e abuts the guide bottom wall 100 from below. The urging member 63 urges the slide guide 62 upward and urges the column unit 11 upward with the first side plate portion 54 and the second side plate portion 55 connected to each other in a state where the urging member 63 abuts the guide bottom wall 100 from below as described above.

Here, as shown in FIGS. 7 and 8, the first through-hole 31 is disposed to be coaxial with the third axis O3. The first through-hole 31 includes a first straight portion 31a and a first tapered portion 31b.

The first straight portion 31a constitutes an inner end portion of the first through-hole 31 in the right-left direction. The first straight portion 31a is a portion of the first through-hole 31 of which the inner diameter is uniform (the angle of inclination (an angle formed between the third axis O3 and an inner peripheral surface of the first through-hole 31) is 0°). That is, the first straight portion 31a linearly extends in the right-left direction as seen in both of a front view and a plan view. The inner diameter of the first through-hole 31 is slightly larger than that of the lock bolt 80. An inner end edge of the first straight portion 31a in the right-left direction coincides with an inner end edge of the first through-hole 31 in the right-left direction.

The first tapered portion 31b is a portion of the first through-hole 31 excluding the first straight portion 31a. In an example shown in the drawing, the first tapered portion 31b constitutes an area from a portion of the first through-hole 31 that is positioned inside the center in the right-left direction to an outer end edge in the right-left direction. The inner diameter of the first tapered portion 31b gradually increases toward the outer side in the right-left direction. An inner end portion of the first tapered portion 31b in the right-left direction is connected to the first straight portion 31a. The first tapered portion 31b has a function as a guide at the time of insertion of the lock bolt 80 into the first through-hole 31 in addition to a function as a draft angle at the time of the molding of the outer column 21. In the example shown in the drawing, the angle of inclination of the first tapered portion 31b is uniform over the entire circumference in the bolt circumferential direction.

The second through-hole 32 is formed such that the second through-hole 32 overlaps with the first through-hole 31 as seen in the right-left direction and the second through-hole 32 and the first through-hole 31 are surface-symmetrical in the right-left direction. Specifically, the second through-hole 32 includes a second straight portion 32a and a second tapered portion 32b.

The second straight portion 32a constitutes an inner end portion of the second through-hole 32 in the right-left direction. The second straight portion 32a linearly extends in the right-left direction as seen in both of a front view and a plan view.

The second tapered portion 32b is a portion of the second through-hole 32 excluding the second straight portion 32a. An inner end portion of the second tapered portion 32b in the right-left direction is connected to the second straight portion 32a. The second tapered portion 32b has a function as a draft angle at the time of the molding of the outer column 21. Regarding the through-holes 31 and 32, the straight portions 31a and 32a and the tapered portions 31b and 32b may have different dimensions.

Next, the operation (the telescopic operation and the tilting operation) of the steering device 1 described above will be described. In the following description, a state where the steering device 1 is in the locked state will be referred to as an initial state.

In a case where the telescopic operation or the tilting operation is to be performed, first, the steering device 1 is caused to enter an unlocked state. To cause the steering device 1 to enter the unlocked state, the operation lever 81 is to be pressed down in a direction in which the thickness of the cam mechanism 82 is decreased (for example, a downward direction). Then, the fastening portions 25 and 26 are separated from each other together with the side plate portions 54 and 55 and thus the inner diameter of the holding tubular portion 24 (the width of the slit 28) is increased. Accordingly, the inner column 22 fastened by the holding tubular portion 24 is released and the outer column 21 fastened by the side plate portions 54 and 55 is released. As a result, the telescopic operation and the tilting operation become able to be performed.

<Telescopic Operation>

To change the position of the steering wheel 2 forward, the steering wheel 2 is to be pressed forward in the unlocked state. Then, the steering wheel 2 moves forward with respect to the outer column 21 together with the inner column 22 and the steering shaft 12. In the case of the steering device 1, the maximum contraction position (the foremost position) of the column unit 11 is defined with the front shock absorption portion 103 abutting a front end edge of the first telescopic guide hole 74 from behind.

Meanwhile, to change the telescopic position of the steering wheel 2 rearward, the steering wheel 2 is to be pulled in the unlocked state. Then, the steering wheel 2 moves rearward with respect to the outer column 21 together with the inner column 22 and the steering shaft 12. In the case of the steering device 1, the maximum expansion position (the rearmost position) of the column unit 11 is defined with the rear shock absorption portion 104 abutting the protruding piece 74c from ahead. In this manner, the position of the steering wheel 2 in the front-rear direction can be adjusted to any position between the maximum contraction position and the maximum expansion position of the column unit 11.

<Tilting Operation>

To change the position of the steering wheel 2 upward, the steering wheel 2 is to be pressed upward in the unlocked state. Then, the lock bolt 80 moves upward in the tilt guide holes 57 and thus the steering wheel 2 rotates upward in a direction around the second axis O2 together with the column unit 11 and the steering shaft 12.

To change the tilt position of the steering wheel 2 downward, the steering wheel 2 is to be pulled down in the unlocked state. Then, the lock bolt 80 moves downward in the tilt guide holes 57 and thus the steering wheel 2 rotates downward in the direction around the second axis O2 together with the column unit 11 and the steering shaft 12. Accordingly, it is possible to adjust the vertical position of the steering wheel 2 to any position.

In the steering device 1, the operation lever 81 is attached to the first side end portion of the lock bolt 80 in the right-left direction. Therefore, in the case of a steering device in the related art, a first side end portion of a lock bolt in a right-left direction may be inclined downward in comparison with a second side end portion because of the weight of an operation lever particularly in the unlocked state. In this case, a load acting between a driven cam and a first side plate portion is likely to become large with the driven cam pressed against the first side plate portion. As a result, the frictional resistance acting when the driven cam slides on an outer surface of the first side plate portion at the time of a tilting operation may become large.

Therefore, in the steering device 1 of the present embodiment, the first through-hole 31 and the second through-hole 32 are configured such that the straight portions 31a and 32a are formed on an inner side in the right-left direction and the tapered portions 31b and 32b are formed on outer sides in the right-left direction.

According to this configuration, even in a case where the first side end portion of the lock bolt 80 in the right-left direction is inclined downward in the unlocked state, inclination of the lock bolt 80 between a lower end edge of the first straight portion 31a and an upper end edge of the second straight portion 32a can be restricted. Accordingly, wobbling of the lock bolt 80 can be suppressed and vibration of the lock bolt 80 at the time of the tilting operation or the like, noise generated by the lock bolt 80 corning into contact with the rear bracket 14 or the like because of the vibration, or the like can be suppressed, for example. As a result, a smooth tilting operation can be realized.

Furthermore, in the present embodiment, the above-described effects are achieved by means of the shapes of the through-holes 31 and 32 of the outer column 21 and thus it is possible to suppress an increase in the number of components or an increase in the number of man-hours for assembly in comparison with a case where a separate sleeve is provided in a through-hole as in the related art.

In the present embodiment, the lock mechanism 61 includes the drive cam 90 that is fixed to the first side end portion of the lock bolt 80 in the right-left direction and the driven cam 91 that faces the drive cam 90 in the right-left direction at a position outside the first side plate portion 54.

According to this configuration, the angle of inclination of the lock bolt 80 (an angle formed between the third axis O3 and the right-left direction) can be made small in comparison with the related art and thus a load acting between the driven cam 91 and the first side plate portion 54 can be reduced. As a result, it is possible to reduce the frictional resistance acting when the driven cam 91 slides on the outer surface of the first side plate portion 54 at the time of a tilting operation. As a result, a smoother tilting operation can be realized.

In the present embodiment, the first straight portion 31a is formed over the entire circumference of an inner end portion of the first through-hole 31 in the right-left direction and the second straight portion 32a is formed over the entire circumference of an inner end portion of the second through-hole 32 in the right-left direction.

According to this configuration, the straight portions 31a and 32a are formed over the entire circumferences of the inner end portions of the through-holes 31 and 32 in the right-left direction. Therefore, it is possible to reduce a difference in circumferential areas of the straight portions 31a and 32a between the steering devices 1 at the time of the molding of the outer column 21. In addition, wobbling of the lock bolt 80 in the vertical direction can be more easily suppressed.

In the present embodiment, the slide guide 62 that includes the shock absorption portions 103 and 104 is mounted on the lock bolt 80, the shock absorption portions 103 and 104 being positioned in the first telescopic guide hole 74 while being on both sides in at least the front-rear direction with respect to the lock bolt 80.

According to this configuration, direct contact between the lock bolt 80 and the hanger bracket 60 can be suppressed at the maximum contraction position or the maximum expansion position of the column unit 11. Therefore, it is possible to suppress generation of noise at the time of the telescopic operation.

In the present embodiment, the slide guide 62 includes the insertion hole 102a into which the lock bolt 80 is inserted and the inner diameter of the insertion hole 102a gradually decreases toward the inner side in the right-left direction.

According to this configuration, wobbling between the lock bolt 80 and the slide guide 62 can be suppressed. Therefore, inclination of the lock bolt 80 in the unlocked state can be more easily suppressed.

In the present embodiment, a supporting portion that supports the lock bolt 80 from below is formed at a portion of the insertion hole 102a that is positioned below the third axis O3.

According to this configuration, the lock bolt 80 is supported from below by a portion of an inner peripheral edge of the insertion hole 102a that is positioned below the third axis O3. Therefore, inclination of the lock bolt 80 in the unlocked state can be more easily suppressed.

Particularly, in the present embodiment, the central axis O4 of the insertion hole 102a is disposed to be offset from the third axis O3 while being disposed above the third axis O3. Accordingly, the portion of the inner peripheral edge of the insertion hole 102a that is positioned below the third axis O3 can function as the supporting portion. Therefore, it is possible to reduce a difference in dimensions of the supporting portion between the steering devices 1 at the time of the molding of the slide guide 62.

In the present embodiment, the urging member 63 that urges the column unit 11 upward via the guide bottom wall 100 is provided between the rear bracket 14 and the column unit 11.

According to this configuration, the slide guide 62 is urged upward together with the column unit 11 and thus wobbling between the slide guide 62 and the hanger bracket 60 can be suppressed. In addition, the outer peripheral surface of the lock bolt 80 can be easily supported by the lower end edge (the supporting portion) of the insertion hole 102a. Therefore, inclination of the lock bolt 80 in the unlocked state can be more easily suppressed.

Although preferable examples of the present disclosure have been described above, the present disclosure is not limited to the examples. Configurations may be added, omitted, replaced, or modified without departing from the gist of the present disclosure. The present disclosure is not limited by the above description, but only by the appended claims.

For example, in the above-described embodiment, a configuration in which the first axis O1 intersects the front-rear direction has been described. However, the present disclosure is not limited to this thereto. The first axis O1 may coincide with the front-rear direction of the vehicle.

Figure 9:
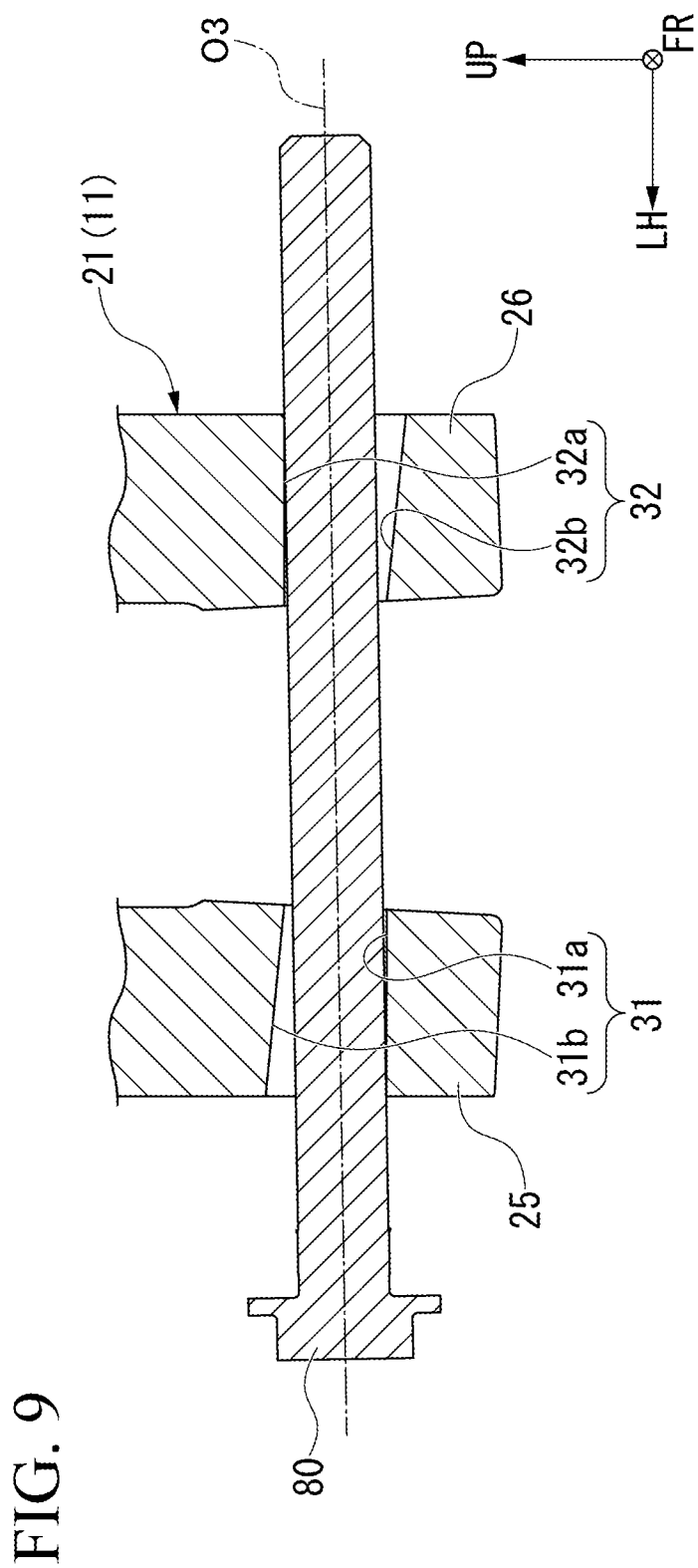
FIG. 9 is a schematic view of a steering device according to a modification example.

In the above-described embodiment, a configuration in which the straight portions 31a and 32a are provided over the entire circumferences of the through-holes 31 and 32 corresponding thereto has been described. However, the present disclosure is not limited thereto. For example, as shown in FIG. 9, only a portion of the first through-hole 31 that is positioned below the lock bolt 80 (a portion that overlaps with the lock bolt 80 as seen from above) and a portion of the second through-hole 32 that is positioned above the lock bolt 80 (a portion that overlaps with the lock bolt 80 as seen from below) may be the straight portions 31a and 32a. In this case, the straight portions 31a and 32a may be formed over the entire through-holes 31 and 32 in the right-left direction, or may be formed over portions of the through-holes 31 and 32.

In the above-described embodiment, a configuration in which a switch between the locked state and the unlocked state is made by the operation of the cam mechanism 82 accompanied by rotation of the lock bolt 80 has been described. However, the present disclosure is not limited thereto. The lock mechanism may switch between the locked state and the unlocked state by means of a mechanism other than the cam mechanism (for example, a gear, a link, or the like). In addition, a sliding operation or the like may be performed on the lock bolt 80 by means of an operation portion.

In the above-described embodiment, a configuration in which the slide guide 62 is formed in an L-like shape mounted over the lock bolt 80 and the hanger bracket 60 has been described. However, the present disclosure is not limited thereto. A configuration in which the slide guide 62 includes the shock absorption portions 103 and 104 and the slide guide 62 is mounted only on the lock bolt 80 may also be adopted.

In the above-described embodiment, a configuration in which wobbling of the lock bolt 80 is suppressed by means of both of the shapes of the through-holes 31 and 32 and the slide guide 62 has been described. However, the present disclosure is not limited thereto. In the steering device, it is sufficient that wobbling of the lock bolt 80 is suppressed by means of at least one of the shapes of the through-holes 31 and 32 and the slide guide 62.

Figure 10:
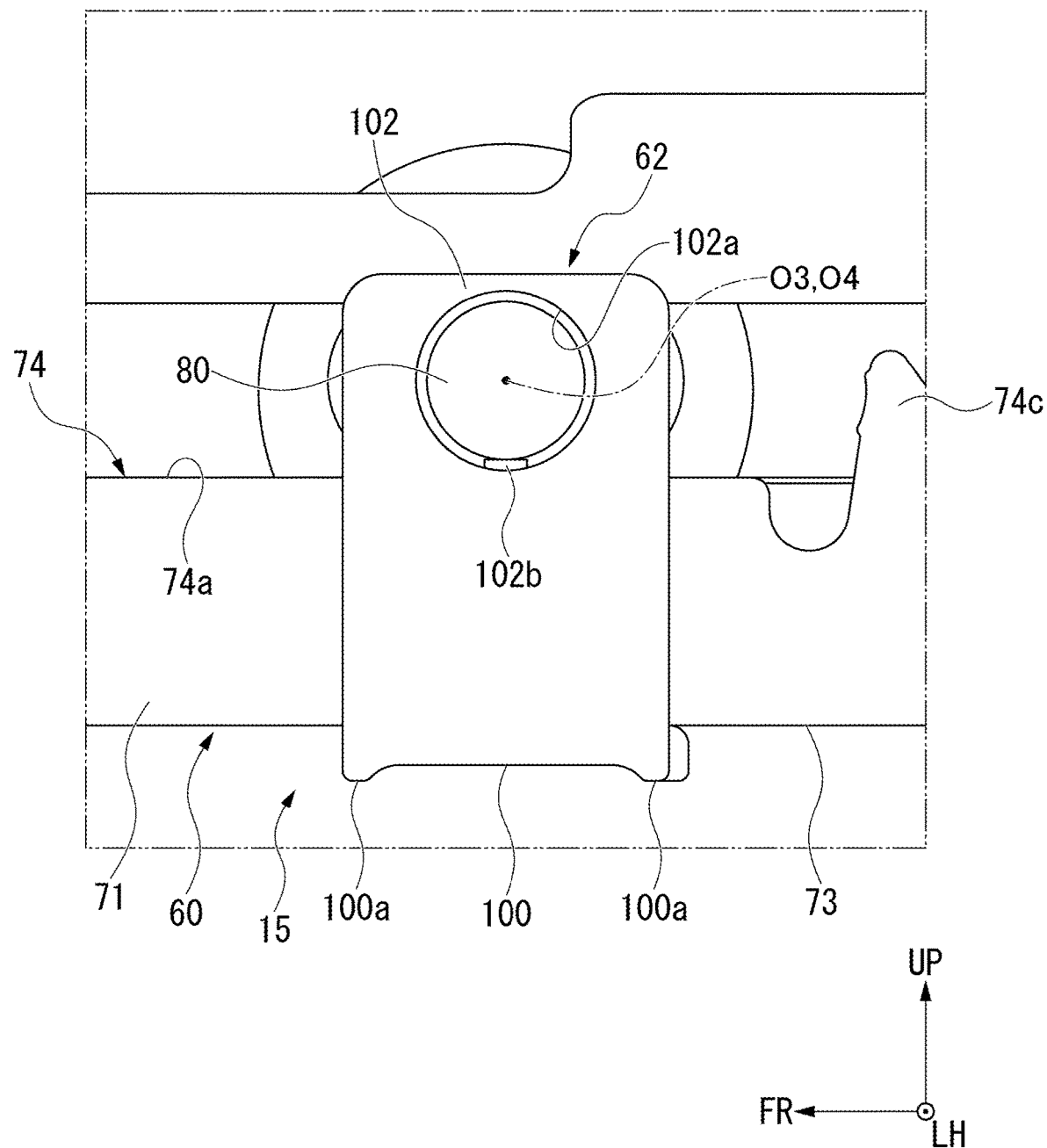
FIG. 10 is a side view of the vicinity of a slide guide according to a modification example.

In the above-described embodiment, a configuration in which the central axis O4 of the insertion hole 102a is offset from the third axis O3 of the lock bolt 80 has been described. However, the present disclosure is not limited thereto. As shown in FIG. 10, a supporting portion 102b that supports the lock bolt 80 from below may be formed at the lower end edge of the insertion hole 102a that is disposed to be coaxial with the third axis O3.

In the above-described embodiment, a configuration in which a transition from the unlocked state to the locked state is made when the operation lever 81 is pulled up (a so-called pull lock type) has been described. However, a configuration in which a transition from the unlocked state to the locked state is made when the operation lever 81 is pressed down (a so-called press lock type) may also be adopted.

In addition, it is possible to replace a component in the above-described embodiment with a well-known component as appropriate without departing from the gist of the present disclosure and the above-described modification examples may be appropriately combined with each other.

While preferred embodiments of the invention have been described and illustrated above, it should be understood that these are exemplary of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

EXPLANATION OF REFERENCES

1: steering device
11: column unit
12: steering shaft
13: front bracket
14: rear bracket
21: outer column
22: inner column
25: first fastening portion
26: second fastening portion
31: first through-hole
31a: first straight portion
31b: first tapered portion
32: second through-hole
32a: second straight portion
32b: second tapered portion
54: first side plate portion (side plate portion)
55: second side plate portion (side plate portion)
57: tilt guide hole
60: hanger bracket
61: lock mechanism
62: slide guide
63: urging member
73: bracket bottom wall
74: first telescopic guide hole (telescopic guide hole)
75: second telescopic guide hole (telescopic guide hole)
80: lock bolt (rod)
90: drive cam
90b: cam portion
91: driven cam
91c: cam follower portion
100: guide bottom wall
102: guide side wall
102a: insertion hole
102b: supporting portion
103: shock absorption portion
104: shock absorption portion
O1: first axis
O2: second axis
O3: third axis (central axis of rod)
O4: central axis

What is claimed is:

1. A steering device comprising:
a column unit configured to support a steering shaft such that the steering shaft is rotatable around a first axis extending along a front-rear direction;
a front bracket configured to support the column unit such that the column unit is rotatable around a second axis extending along a right-left direction, the front bracket being attached to a vehicle body;
a rear bracket that includes side plate portions and that is attached to the vehicle body behind the front bracket, the side plate portions being positioned on both sides in the right-left direction with respect to the column unit and being provided with tilt guide holes formed to extend in a vertical direction; and
a lock mechanism configured to switch between a locked state in which the column unit is restricted from moving around the second axis with respect to the front bracket and an unlocked state in which the column unit is allowed to move around the second axis with respect to the front bracket,
wherein the column unit includes
a first fastening portion that includes a first through-hole penetrating the first fastening portion in the right-left direction and that is provided on a first side in the right-left direction with respect to the first axis, and
a second fastening portion that includes a second through-hole penetrating the second fastening portion in the right-left direction, that is provided on a second side in the right-left direction with respect to the first axis, and that approaches the first fastening portion or is separated from the first fastening portion as the lock mechanism transitions between the locked state or the unlocked state,
the lock mechanism includes
a rod configured to penetrate the first through-hole, the second through-hole, and the tilt guide holes in the right-left direction and supported by the column unit so as to be movable in the vertical direction in the tilt guide holes in the unlocked state, and
an operation portion that is fixed to a first side end portion of the rod in the right-left direction and that is used to operate of the rod,
the first through-hole includes
a first straight portion that linearly extends in the right-left direction at least a portion positioned below the rod, and
a first tapered portion that is a portion excluding the first straight portion and at which an inner diameter of the first through-hole gradually increases toward a first side in the right-left direction, and
the second through-hole includes
a second straight portion that linearly extends in the right-left direction at least a portion positioned above the rod, and
a second tapered portion that is a portion excluding the second straight portion and at which an inner diameter of the second through-hole gradually increases toward a second side in the right-left direction.

2. The steering device according to claim 1,
wherein the lock mechanism includes
a drive cam that includes a cam portion and that is fixed to the first side end portion of the rod in the right-left direction, and
a driven cam that includes a cam follower portion sliding on the cam portion as the rod rotates and that faces the drive cam in the right-left direction at a position outside one of the side plate portions that is disposed on the first side in the right-left direction with respect to the first fastening portion.

3. The steering device according to claim 2,
wherein the first straight portion is formed over an entire circumference of a second side end portion of the first through-hole in the right-left direction, and
the second straight portion is formed over an entire circumference of a first side end portion of the second through-hole in the right-left direction.

4. The steering device according to claim 2,
wherein the column unit includes
an outer column that includes the first fastening portion and the second fastening portion and that has a tubular shape, and
an inner column inserted into the outer column so as to be movable forward and backward and configured to rotatably support the steering shaft,
a hanger bracket is provided at a portion of the inner column that is positioned between the first fastening portion and the second fastening portion,
a telescopic guide hole into which the rod is inserted and that extends in the front-rear direction is formed in the hanger bracket, and
a slide guide that includes shock absorption portions is mounted on the rod, the shock absorption portions being positioned in the telescopic guide hole while being on both sides in at least the front-rear direction with respect to the rod.

5. The steering device according to claim 1,
wherein the first straight portion is formed over an entire circumference of a second side end portion of the first through-hole in the right-left direction, and
the second straight portion is formed over an entire circumference of a first side end portion of the second through-hole in the right-left direction.

6. The steering device according to claim 5,
wherein the column unit includes
an outer column that includes the first fastening portion and the second fastening portion and that has a tubular shape, and
an inner column inserted into the outer column so as to be movable forward and backward and configured to rotatably support the steering shaft,
a hanger bracket is provided at a portion of the inner column that is positioned between the first fastening portion and the second fastening portion,
a telescopic guide hole into which the rod is inserted and that extends in the front-rear direction is formed in the hanger bracket, and
a slide guide that includes shock absorption portions is mounted on the rod, the shock absorption portions being positioned in the telescopic guide hole while being on both sides in at least the front-rear direction with respect to the rod.

7. The steering device according to claim 1,
wherein the column unit includes
an outer column that includes the first fastening portion and the second fastening portion and that has a tubular shape, and
an inner column inserted into the outer column so as to be movable forward and backward and configured to rotatably support the steering shaft,
a hanger bracket is provided at a portion of the inner column that is positioned between the first fastening portion and the second fastening portion,
a telescopic guide hole into which the rod is inserted and that extends in the front-rear direction is formed in the hanger bracket, and
a slide guide that includes shock absorption portions is mounted on the rod, the shock absorption portions being positioned in the telescopic guide hole while being on both sides in at least the front-rear direction with respect to the rod.

8. The steering device according to claim 4,
wherein the slide guide includes an insertion hole into which the rod is inserted,
an inner diameter of the insertion hole gradually decreases toward the second fastening portion from the first fastening portion.

9. The steering device according to claim 5,
wherein the hanger bracket includes
a bracket side wall in which the telescopic guide hole is formed, and
a bracket bottom wall that extends in the right-left direction from a lower end edge of the bracket side wall,
the slide guide includes
a guide side wall that includes the insertion hole and that is disposed on the first side in the right-left direction with respect to the bracket side wall, and
a guide bottom wall that extends in the right-left direction from a lower end edge of the guide side wall and that is disposed below the bracket bottom wall, and
an urging member configured to urge the column unit upward via the guide bottom wall is provided between the rear bracket and the column unit.

10. The steering device according to claim 8,
wherein the slide guide includes an insertion hole into which the rod is inserted, and
a supporting portion configured to support the rod from below is formed at the insertion hole.

11. The steering device according to claim 7,
wherein the slide guide includes an insertion hole into which the rod is inserted, and
a supporting portion configured to support the rod from below is formed at the insertion hole.

12. The steering device according to claim 11,
wherein a central axis of the insertion hole is disposed to be offset from a central axis of the rod while being disposed above the central axis of the rod, and a portion of an inner peripheral edge of the insertion hole that is positioned below the rod constitutes the supporting portion.

13. The steering device according to claim 12,
wherein the hanger bracket includes
- a bracket side wall in which the telescopic guide hole is formed, and
- a bracket bottom wall that extends in the right-left direction from a lower end edge of the bracket side wall, the slide guide includes
- a guide side wall that includes the insertion hole and that is disposed on the first side in the right-left direction with respect to the bracket side wall, and
- a guide bottom wall that extends in the right-left direction from a lower end edge of the guide side wall and that is disposed below the bracket bottom wall, and an urging member configured to urge the column unit upward via the guide bottom wall is provided between the rear bracket and the column unit.

14. The steering device according to claim 11,
wherein the hanger bracket includes
- a bracket side wall in which the telescopic guide hole is formed, and
- a bracket bottom wall that extends in the right-left direction from a lower end edge of the bracket side wall, the slide guide includes
- a guide side wall that includes the insertion hole and that is disposed on the first side in the right-left direction with respect to the bracket side wall, and
- a guide bottom wall that extends in the right-left direction from a lower end edge of the guide side wall and that is disposed below the bracket bottom wall, and an urging member configured to urge the column unit upward via the guide bottom wall is provided between the rear bracket and the column unit.

* * * * *